(12) United States Patent
Oh

(10) Patent No.: US 7,806,446 B2
(45) Date of Patent: Oct. 5, 2010

(54) LOCKING DEVICE FOR AUTOMOBILE TRAY

(75) Inventor: Young Ki Oh, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 626 days.

(21) Appl. No.: 11/689,206

(22) Filed: Mar. 21, 2007

(65) Prior Publication Data

US 2008/0136193 A1   Jun. 12, 2008

(30) Foreign Application Priority Data

Dec. 7, 2006   (KR) ...................... 10-2006-0123974

(51) Int. Cl.
*E05C 1/12* (2006.01)

(52) U.S. Cl. .............................. 292/165; 292/DIG. 37; 292/137

(58) Field of Classification Search .......... 292/DIG. 37, 292/1, 37, 216, 163, 137, 138, 165, 146, 292/150, 169, 175, DIG. 11
See application file for complete search history.

(56) References Cited

U.S. PATENT DOCUMENTS

| 7,188,871 | B2 * | 3/2007 | Nemoto et al. | .............. 292/170 |
| 7,383,707 | B2 * | 6/2008 | Yamada et al. | ................ 70/208 |
| 2007/0080553 | A1 * | 4/2007 | Kim | .......................... 296/37.1 |

FOREIGN PATENT DOCUMENTS

| KR | 10-2004-0043461 | 5/2004 |
| KR | 10-0448201 | 9/2004 |
| KR | 10-0579641 | 5/2006 |

OTHER PUBLICATIONS

English Language Abstract of KR 10-2004-0043461.
English Language Abstract of KR 10-2005-0120271.
English Language Abstract of KR 10-2004-0003251.

* cited by examiner

*Primary Examiner*—Peter M Cuomo
*Assistant Examiner*—Kristina R Fulton
(74) *Attorney, Agent, or Firm*—Greenblum & Bernstein, P.L.C.

(57) ABSTRACT

A locking device for an automobile tray is disclosed. The locking device includes an inner housing having a front panel formed with a holding recess, an outer housing internally defining an operating space for sliding movement of the inner housing therein, a mount member having a bottom opening for communicating with the holding recess and a front operating opening, a knob partially protruded outward through the operating opening of the mount member, the knob being linearly moved into the operating opening by the user's operation, a rotating member having a hinge shaft connected to the mount member so as to be rotated by the knob, a first elastic member having one end supported by the mount member and the other end supported by the rotating member, to provide the rotating member with an elastic restoration force so as to return the rotating member to its original position, a latch member configured to be caught by one end of the rotating member, the latch member being moved upward by the rotating member so as to be released from the holding recess, and a second elastic member installed between the latch member and the mount member and adapted to provide the latch member with an elastic restoration force so as to allow the latch member to be returned downward through the bottom opening of the mount member.

7 Claims, 8 Drawing Sheets

PRIOR ART

LOCKING DEVICE FOR AUTOMOBILE TRAY

BACKGROUND OF THE INVENTION

1. Field of the Invention

The present invention relates to an automobile tray, and more particularly, to a locking device for an automobile tray wherein a horizontal movement of a knob, which is manually operated to open the tray, is converted into a rotating movement of a rotating member and in turn, the rotating movement of the rotating member is converted into a vertical movement of a latch member, whereby locking and unlocking of the tray can be easily accomplished even in a limited space.

2. Description of the Related Art

Generally, an automobile contains several storage places therein for storing a variety of large and small items.

Examples of the automobile storage spaces include a trunk room, which is suitable for storing relatively large items and allows the stored items to be taken out at the outside of an automobile, and an automobile tray which is suitable for storing relatively small and light-weight items and allows a driver or passenger to easily take out frequently used items in the passenger room of the automobile.

In the case where it is difficult to store a certain item in the passenger room or trunk room of an automobile because of an excessively large volume or long length of the item, an auxiliary carriage device may be mounted to a roof of the automobile for carrying the item.

Now, a conventional automobile tray will be described with reference to the accompanying drawings.

FIG. 1 is a sectional view illustrating a locking device for a conventional automobile tray, prior to being operated, and FIG. 2 is a sectional view illustrating the locking device for the conventional automobile tray shown in FIG. 1, after being operated.

As shown in FIGS. 1 and 2, the conventional automobile tray is installed below an automobile dash panel 1 or a center facia, or the like. A knob 2 for opening and closing the tray protrudes outward from a front surface of the tray.

The tray includes an outer housing 7 defining an outer body and an inner housing 6 slidably received in the outer housing 7.

The knob 2 is adapted to perform a horizontal reciprocating movement. An L-shaped latch 3 is provided at a rear side of the knob 2 and adapted to perform a rotating movement by the horizontal movement of the knob 2.

To ensure the latch 3 and the knob 2 to be returned to their original positions, a spring 4 is wound on a rotating shaft of the latch 3.

One end of the latch 3 comes into contact with the knob 2, and the other end of the latch 3 is caught by a holding aperture 5 that is perforated in an upper end of the inner housing 6.

In the conventional automobile tray having the above described configuration, if a user presses the knob 2 with his/her finger, as shown in FIG. 2, the knob 2 is moved horizontally into the dash panel 1, thereby causing the latch 3 to be rotated.

As the latch 3 is rotated, the other end of the latch 3 is released from the holding aperture 5. Then, if the user takes away his/her finger from the knob 2, the latch 3 and the knob 2 are returned to their original positions by a restoration force of the spring 4.

However, for the sake of the locking and unlocking of the conventional tray, a linear movement of the knob 2 must be converted into a rotating movement of the latch 3. In this case, if the tray locking device only has a limited installation space, the knob 2 has a short linear movement distance and thus, the latch 3 has a short upward movement distance. This is problematic because the latch 3 may fail to be completely released from the holding aperture 5.

Furthermore, in the above described configuration, both the latch 3 and the knob 2 are adapted to be returned to their original positions by the single spring 4. Therefore, if a tensile force of the spring 4 is regulated for the sake of regulating an operating force of the knob 2, it may have an effect on an operating force of the latch 3. Conversely, if the tensile force of the spring 4 is regulated for the sake of regulating the operating force of the latch 3, it may have an effect on the operating force of the knob 2. Accordingly, there is a necessity for an improvement in the return operation of the latch 3 and the knob 2

SUMMARY OF THE INVENTION

Therefore, the present invention has been made in view of the above necessity, and it is an aspect of the present invention to provide a locking device for an automobile tray wherein a latch can achieve a sufficient vertical movement distance even if a knob, which is pressed to open the tray, has a short operating distance, thereby ensuring efficient opening of the tray.

It is another aspect of the present invention to provide a locking device for an automobile tray wherein operating forces of a knob and a latch can be regulated individually by different members, differently from the prior art wherein the knob and the latch are configured to be returned to their original positions by a single spring, thereby preventing a degradation in the operation characteristics of the knob and the latch.

In accordance with the present invention, the above and other objects can be accomplished by the provision of a locking device for an automobile tray comprising: an inner housing having a front panel formed with a holding recess; an outer housing defining an operating space therein for allowing the inner housing to be slidably moved in the outer housing; a mount member having a bottom opening for communicating with the holding recess and a front operating opening; a knob partially protruded outward through the operating opening of the mount member, the knob being linearly moved into the operating opening by the user's manual operation; a rotating member having a hinge shaft connected to the mount member, so as to be rotated by the knob; a first elastic member having one end supported by the mount member and the other end supported by the rotating member, the first elastic member providing the rotating member with an elastic restoration force to allow the rotating member to be returned to its original position; a latch member having a body configured to be caught by one end of the rotating member coupled with the first rotating member, the latch member being moved upward by the rotating member so as to be released from the holding recess; and a second elastic member installed between the latch member and the mount member and adapted to provide the latch member with an elastic restoration force, so as to allow the latch member to be returned downward through the bottom opening of the mount member.

Preferably, the knob comprises at least one upwardly-opened tubular press piece protruded from one end thereof, and the rotating member comprises at least one upper protrusion configured to come into contact with the press piece, so as to allow the rotating member to be rotated by the knob.

Preferably, contact portions of the press piece and the upper protrusion are obliquely disposed relative to each other, and the upper protrusion is located on the press piece.

Preferably, the rotating member further comprises at least one lower protrusion spaced apart from the upper protrusion, the lower protrusion being caught by a portion of the latch member.

Preferably, the first elastic member comprises a first coil member and a second coil member to be inserted around opposite ends of the hinge shaft, respectively, and a connecting bar for connecting the first and second coil members to each other.

Preferably, the latch member comprises: a guide bar protruded upward from an upper end of the latch member for coupling of the second elastic member; and a locking protrusion protruded downward from a lower end of the latch member so as to be inserted into the holding recess.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
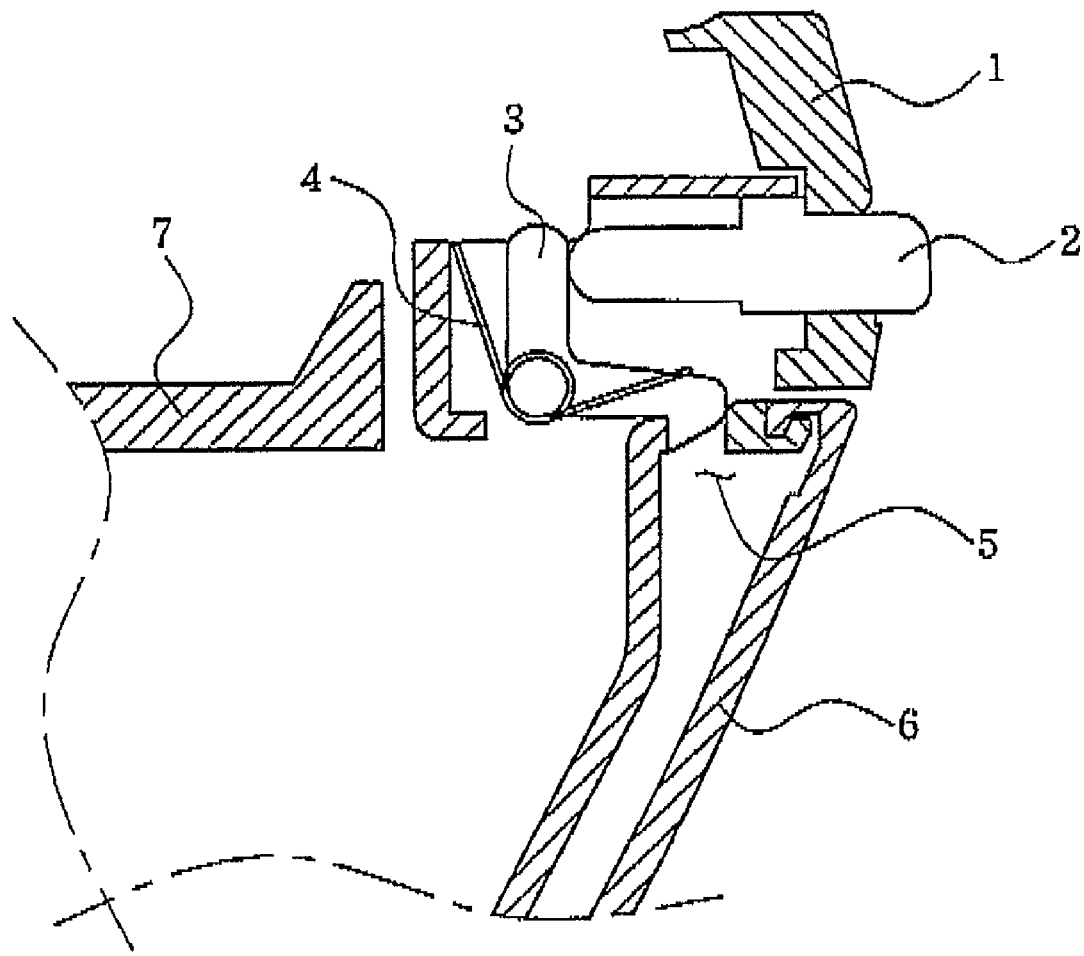
FIG. 1 is a sectional view illustrating a locking device for a conventional automobile tray, prior to being operated.
Figure 2:
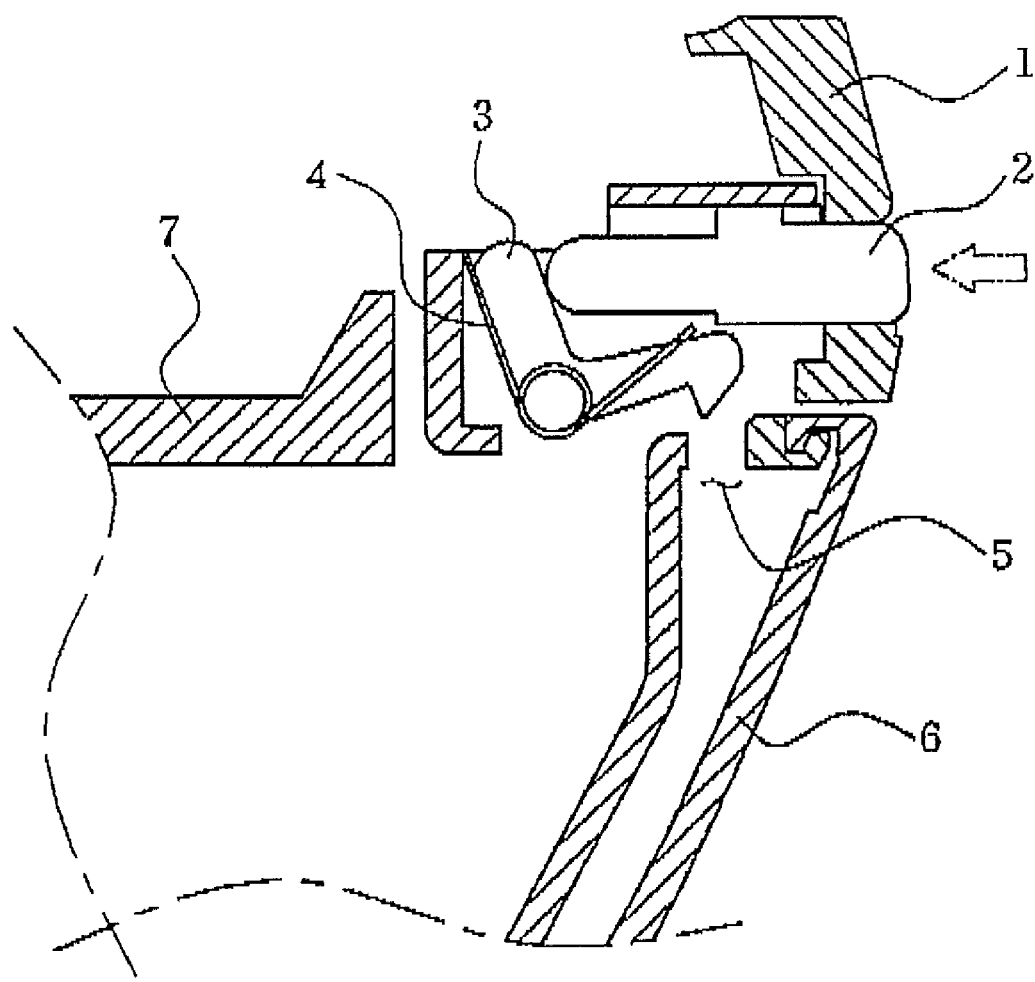
FIG. 2 is a sectional view illustrating the locking device for the conventional automobile tray shown in FIG. 1, after being operated.

Now, a locking device for an automobile tray according to an exemplary embodiment of the present invention will now be described in detail with reference to the accompanying drawings. For the sake of convenience for explanation, a tray mounted in an automobile is exemplified, and the thickness of lines or the size of constituent elements shown in the drawings may be illustrated exaggeratingly for the clarity and convenience of description. Also, the terms of constituent elements, which will be described hereinafter, are defined in consideration of their functions in the present invention and may be changed according to the intention of a user or an operator, or according to the custom. Accordingly, definitions of these terms must be based on the overall description herein.

As shown in FIGS. 3 to 6, the automobile tray locking device according to the present invention includes an outer housing 20 defining an outer body and an inner housing 10 slidably operable in the outer housing 20.

The inner housing 10 has a holding recess 14 formed at an upper end of a front surface thereof. The outer housing 20 internally defines an operating space where the inner housing 10 is slidably movable.

A mount member 30 is coupled to an upper end of the outer housing 20. The mount member 30 includes an upper mount 32 and a lower mount 34.

The lower mount 34 of the mount member 30 has a bottom opening, which is perforated in a bottom surface of the lower mount 34 to communicate with the holding recess 14. The upper mount 32, which is mounted on the lower mount 34, has an operating opening 36, which is perforated in a front surface of the upper mount 32 for allowing a knob 40 to be reciprocally moved through the operating opening 36.

The knob 40 is coupled through the operating opening 36 of the mount member 30 such that a part of the knob 40 protrudes outward from the operating opening 36. The knob 40 is manually operated by a user, so as to be linearly moved into the operating opening 36.

A rotating member 50 is also coupled to the mount member 30 by use of a hinge shaft 52 such that the rotating member 50 is rotated by the knob 40.

The knob 40 has a pair of upwardly opened tubular press pieces 42, which protrude from one end of the knob 40 at left and right positions of the end of the knob 40. The rotating member 50 has a pair of upper protrusions 54 configured to come into contact with the press pieces 42, respectively, for allowing the rotating member 50 to be rotated by the knob 40.

Contact portions of the press piece 42 and the corresponding upper protrusion 54 are obliquely disposed relative to each other, and the upper protrusion 54 is located on the press piece 42. With this configuration, the upper protrusion 54 is able to be slidably moved inward of the corresponding press piece 42 as the knob 40 is horizontally moved. This has the effect of ensuring a relatively accurate rotating movement of the rotating member 50.

To return the rotating-member 50 to its original position, a first elastic member 60 is provided in such a manner that one end of the first elastic member 60 is supported by the mount member 30 and the other end of the first elastic member 60 is supported by the rotating member 50. Thereby, the first elastic member 60 acts to provide the rotating member 50 with an elastic restoration force.

The first elastic member 60 has a first coil member 62 and a second coil member 64, which are configured to be inserted, respectively, around opposite ends of the hinge shaft 52, and a connecting bar 66 for connecting the first and second coil members 62 and 64 to each other.

The connecting bar 66 is installed such that the connecting bar 66 comes into contact with an inclined surface of each upper protrusion 54 opposite to the knob 40. The connecting bar 66 is rotated simultaneously with a rotating movement of the rotating member 50.

The rotating member 50, to which the first elastic member 60 is coupled, further has a pair of lower protrusions 56, which are spaced apart from the upper protrusions 54.

A latch member 70 is engaged with the rotating member 50 such that the latch member 70 is vertically moved by a rotating movement of the rotating member 50. The latch member 70 has a locking protrusion 74, which protrudes downward from a lower end of the latch member 70 so as to be inserted into the holding recess 14.

The latch member 70 further has a guide bar, which protrudes upward from an upper end of the latch member 70 for coupling of a second elastic member 80. In addition, the latch member 70 has a pair of insertion openings 76, which are perforated in a body of the latch member 70 at left and right positions of the body for insertion and fixation of the lower protrusions 56 of the rotating member 50.

The second elastic member 80 is installed between the latch member 70 and the mount member 30 and adapted to provide the latch member 70 with an elastic restoration force. Thereby, under operation of the second elastic member 80, the latch member 70 is able to be returned downward to its original position through the bottom opening of the mount member 30.

The upper mount 32 has a guide hole 33 for movement of the guide bar 72. The guide hole 33 has a diameter, which is larger than that of the guide bar 72, but is smaller than that of the second elastic member 80. This is to prevent the second elastic member 80 from being separated outward through the guide hole 33.

Figure 3:
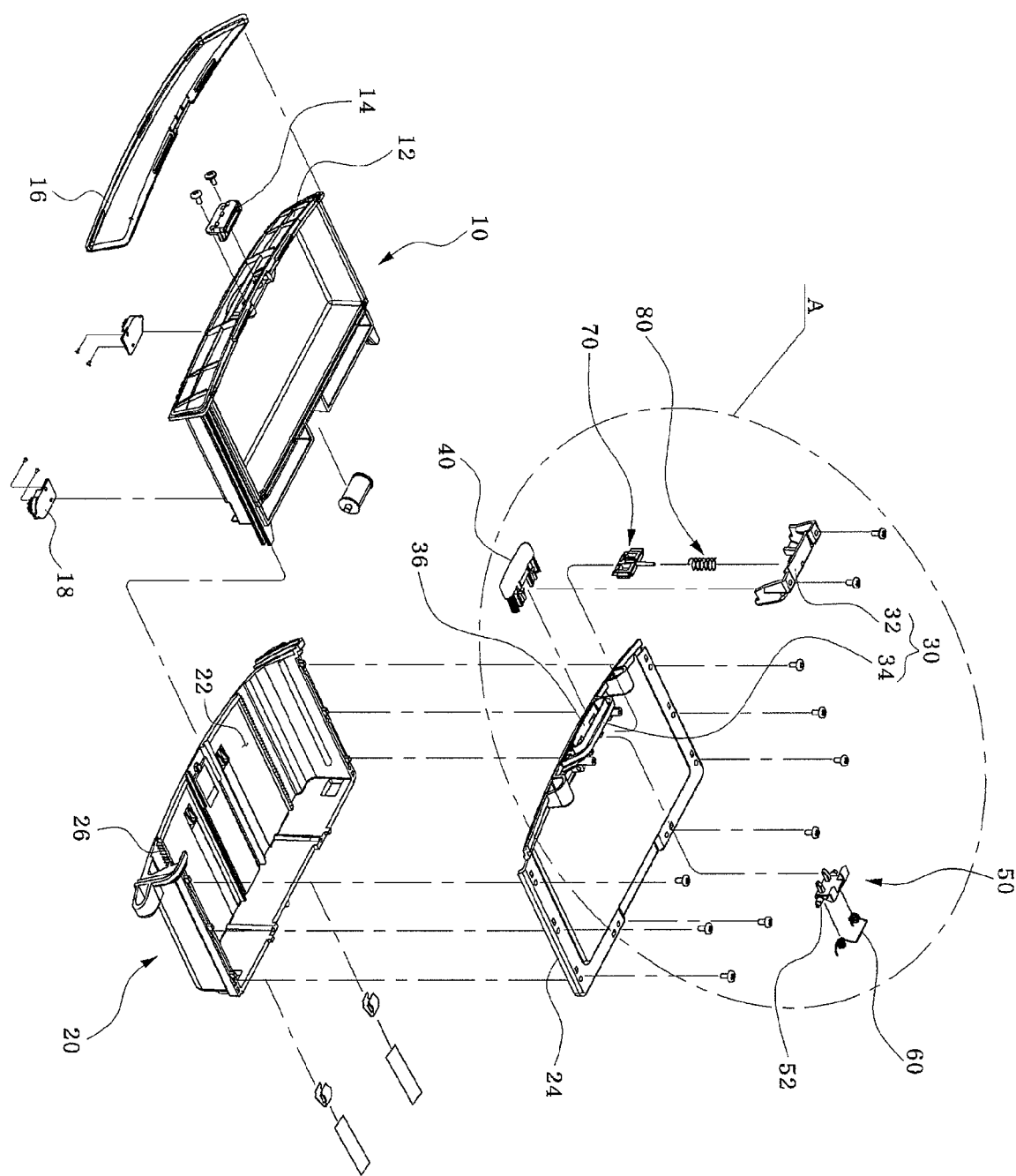
FIG. 3 is an exploded perspective view illustrating a locking device for an automobile tray according to an exemplary embodiment of the present invention.
Figure 4:
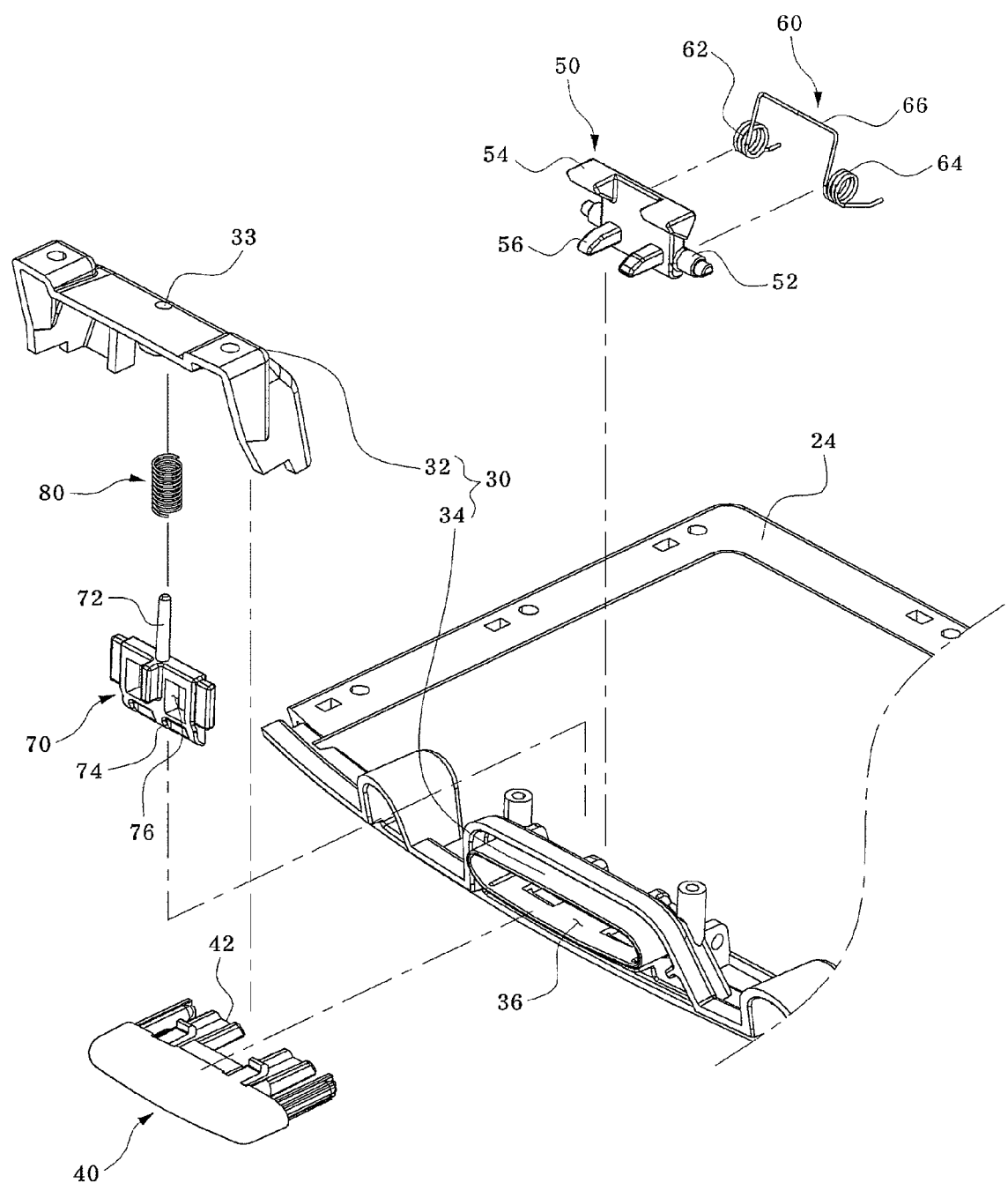
FIG. 4 is an enlarged perspective view of a portion "A" shown in FIG. 3.

As shown in FIG. 3, the inner housing 10 includes a front frame 16 and a front panel 12. Also, at least one damper 18 is installed to a lower surface or side surface of the inner housing 10.

To be engaged with a circular gear provided at the damper 18, a linear guiding gear 26 is provided at a bottom surface or side surface of the outer housing 20, so as to guide a sliding movement of the inner housing 10.

The outer housing 20 includes a housing body defining an operating space 22 therein and an upper frame 24 coupled to an upper end of the housing body. The mount member 30 is coupled to the upper end of the outer housing 20 and defines an interior space for installation of several elements, for example, the knob 40, the rotating member 50, and the latch member 70.

Hereinafter, the operation of the automobile tray locking device according to the exemplary embodiment of the present invention, which has the above described configuration, will be described.

Figure 5:
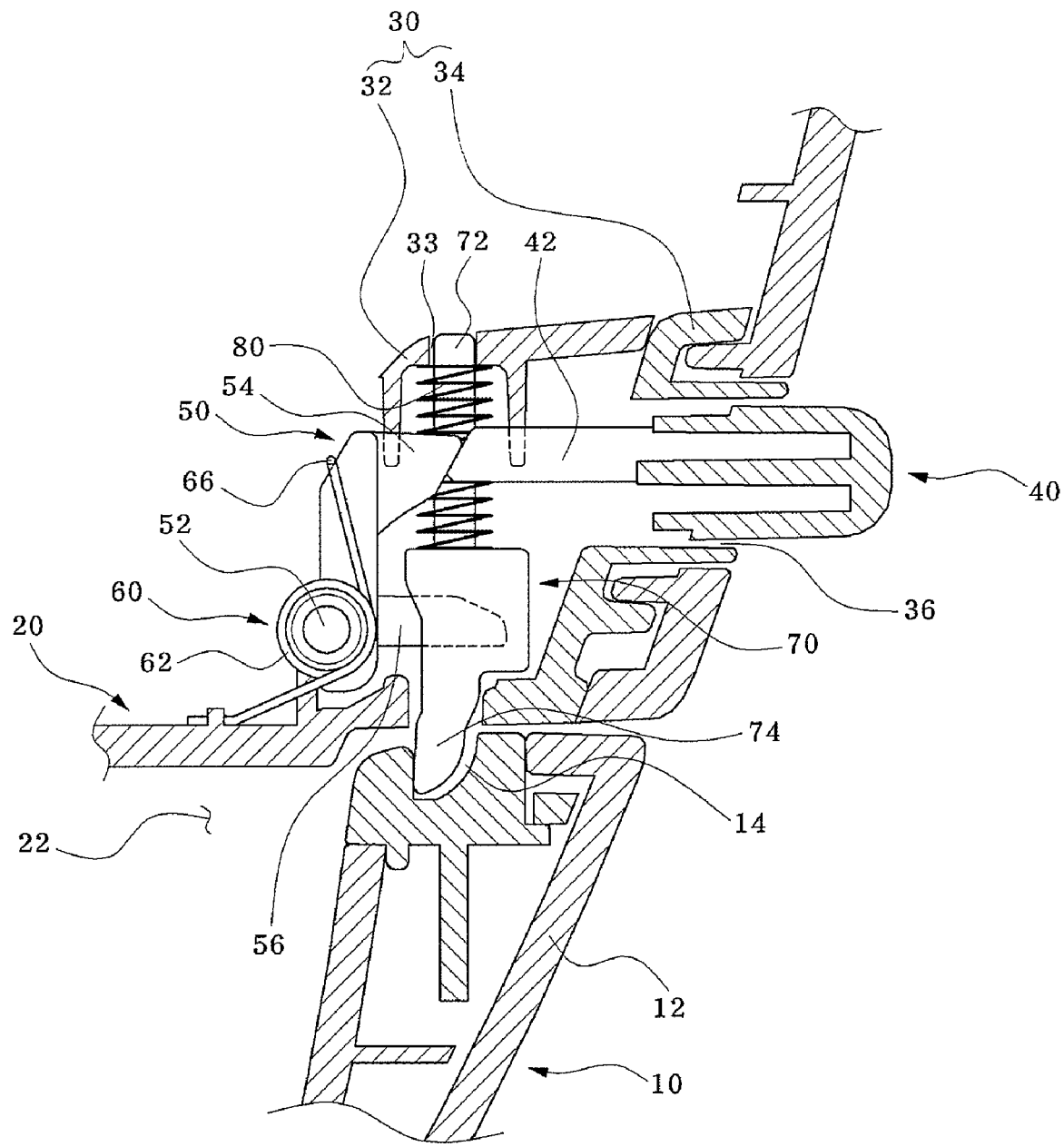
FIG. 5 is a side sectional view illustrating the automobile tray locking device according to the exemplary embodiment of the present invention, prior to being operated.

As shown in FIG. 5, the knob 40 is initially mounted to protrude into the passenger room of an automobile as the rotating member 50 is rotated clockwise and returned to its original position by the elastic force of the first elastic member 60.

Figure 7:
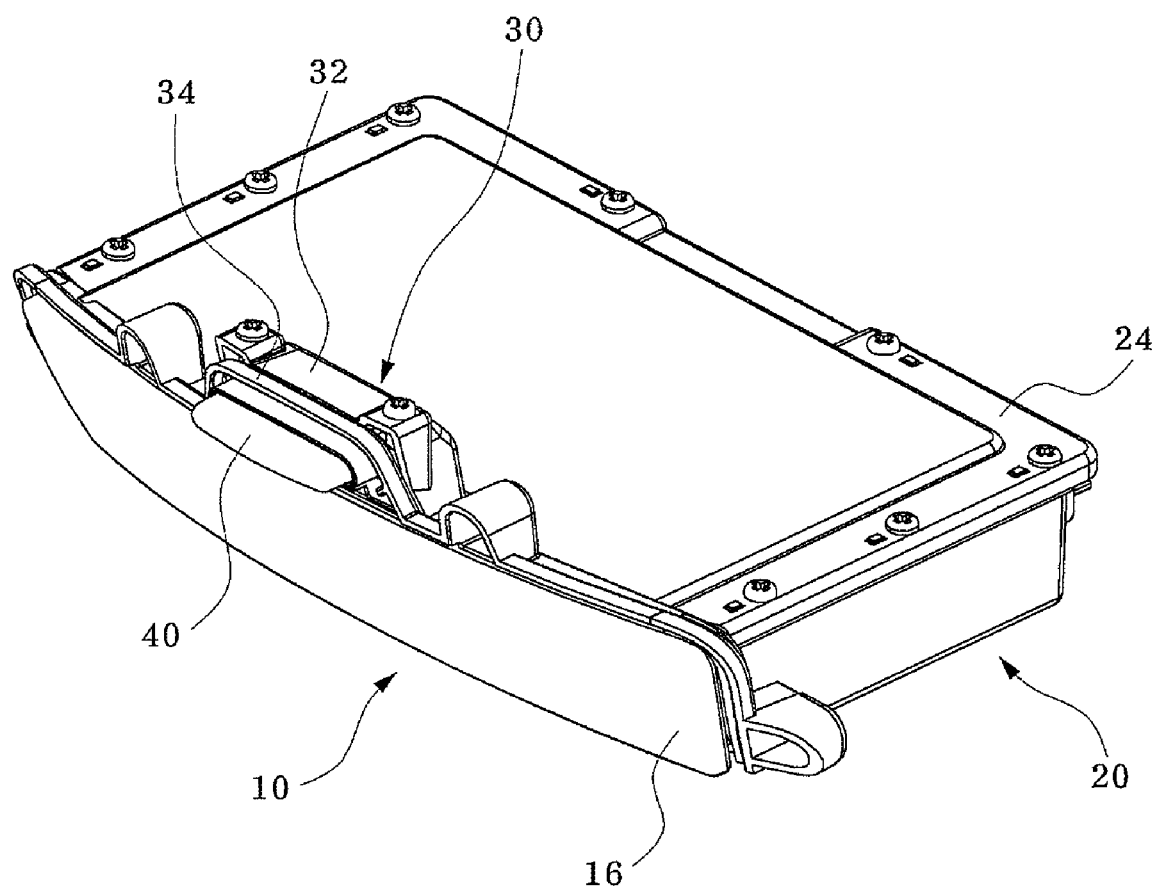
FIG. 7 is a perspective view illustrating a locked state of the automobile tray locking device shown in FIG. 3.

In the initial state, the latch member 70 is pressed downward by the second elastic member 80 and caught by the holding recess 14 of the inner housing 10 so as to restrict movement of the inner housing 10. Thereby, as shown in FIG. 7, the inner housing 10 is fixedly received in the outer housing 20.

Figure 6:
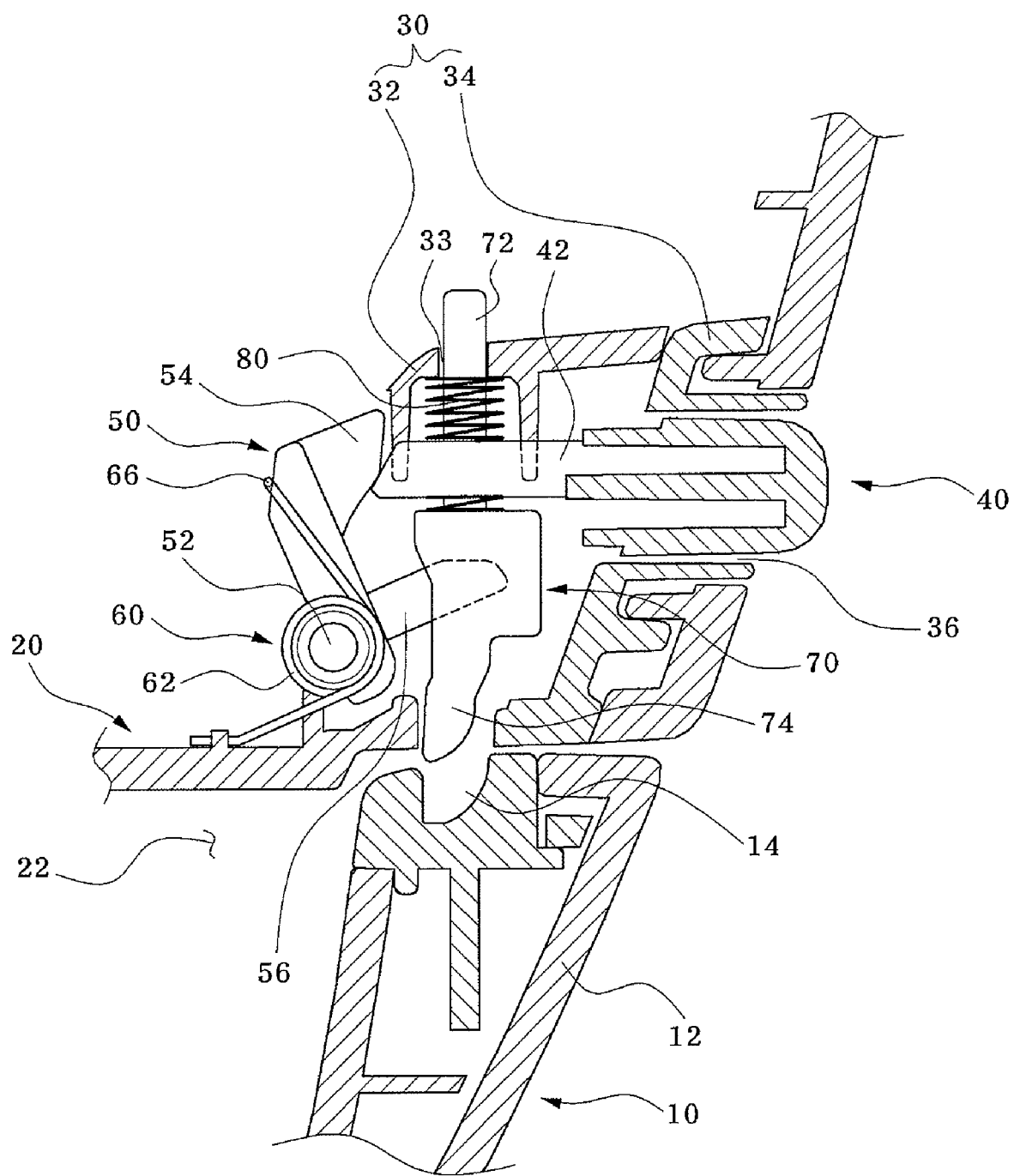
FIG. 6 is a side sectional view illustrating the automobile tray locking device shown in FIG. 5, after being operated.

Then, as shown in FIG. 6, if the knob 40 is pressed by the user's finger and horizontally moved, the press pieces 42 of the knob 40 push the upper protrusions 54 of the rotating member 50, thereby causing the rotating member 50 to be rotated about the hinge shaft 52.

In this case, the press pieces 42 come into oblique contact with the upper protrusions 54. Therefore, the upper protrusions 54 are able to be efficiently pushed and rotated by the press pieces 42 and this has the effect of ensuring more smooth rotation of the rotating member 50.

The above described rotation of the rotating member 50 by the knob 40 is possible because a finger press force applied to the knob 40 is greater than the elastic force of the first elastic member 60.

As the rotating member 50 is rotated counterclockwise, the lower protrusions 56 are rotated counterclockwise in a state of being inserted into the insertion openings 76 of the latch member 70. Accordingly, the latch member 70 is moved upward by the rotating member 50.

Figure 8:
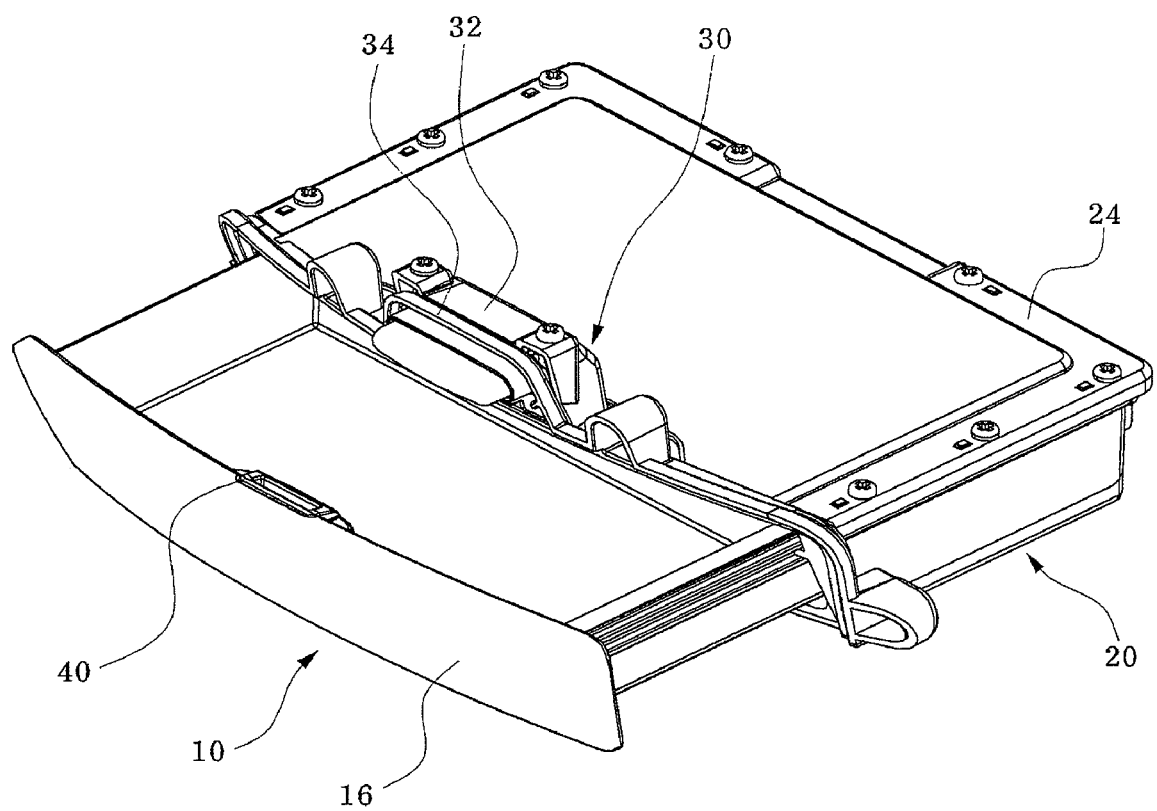
FIG. 8 is a perspective view illustrating an opened inner housing of the tray shown in FIG. 7.

With the upward movement of the latch member 70, the latch member 70 is released from the holding recess 14 to unlock the locking device. As a result, as shown in FIG. 8, the inner housing 10 is able to be taken out of the outer housing 20.

Thereafter, if the finger press force applied to the knob 40 is removed, the rotating member 50 is rotated clockwise by the first elastic member 60, and the knob 40 is returned to its original position as shown in FIG. 5. Simultaneously, the latch member 70 is moved downward by the second elastic member 80 and inserted into the holding recess 14 to return the locking device to its locked state.

With the above described configuration, even if the knob 40 has a short horizontal movement distance, the latch member 70 can achieve a long vertical movement distance. Accordingly, the latch member 70 can be surely inserted into or separated from the holding recess 14, resulting in an improvement in the utilization of space and the reliability of operation.

Here, the operating force of the knob 40 is able to be regulated by the first elastic member 60, and the operating force of the latch member 70 is able to be regulated by the second elastic member 80. Accordingly, the operation characteristics of the knob 40 and the latch member 70 can be easily regulated by simply exchanging the first and second elastic members 60 and 80.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

Also, although the present invention exemplifies the locking device for a tray that is mounted in an automobile, the present invention is not limited thereto. That is to say, the locking device of the present invention is applicable to a variety of trays that are mounted in other mechanical devices and transportation appliances except for automobiles.

Accordingly, the true technical protection scope of the present invention has to be determined by the following claims.

As apparent from the above description, the present invention provides a locking device for an automobile tray wherein a latch can achieve a sufficient vertical movement distance satisfying a related safety regulation, even if a knob, which is pressed to open the tray, has a relatively short operating distance.

Further, according to the present invention, the operating force of the knob is regulated by a first elastic member and the operating force of the latch is regulated by a second elastic member. Accordingly, the operating forces of the knob and the latch can be regulated individually in consideration of the user's intension and the use purpose of the locking device, and this results in an improvement in the operation characteristics of the knob and the latch.

What is claimed is:

1. A locking device for an automobile tray, comprising:
   an inner housing having a front panel formed with a holding recess;
   an outer housing defining an operating space therein for allowing the inner housing to be slidably moved in the outer housing;
   a mount member having a bottom opening for communicating with the holding recess and a front operating opening;
   a knob partially protruded outward through the operating opening of the mount member, the knob being linearly moved into the operating opening by manual operation;

a rotating member having a hinge shaft connected to the mount member, so as to be rotated by the knob;

a first elastic member having one end supported by the mount member and the other end supported by the rotating member, the first elastic member providing the rotating member with an elastic restoration force to allow the rotating member to be returned to its original position;

a latch member having a body configured to be caught by one end of the rotating member coupled with the rotating member, the latch member being moved upward by the rotating member so as to be released from the holding recess, wherein rotation of the rotating member causes at least one lower protrusion of the rotating member to lift the latch member in a vertical direction; and a second elastic member installed between the latch member and the mount member and adapted to provide the latch member with an elastic restoration force, so as to allow the latch member to be returned downward through the bottom opening of the mount member.

2. The locking device according to claim 1, wherein the knob comprises at least one press piece protruded from one end thereof, and the rotating member comprises at least one upper protrusion configured to come into contact with the press piece, so as to allow the rotating member to be rotated by the knob.

3. The locking device according to claim 2, wherein contact portions of the press piece and the upper protrusion are obliquely disposed relative to each other.

4. The locking device according to claim 2, wherein the at least one lower protrusion is spaced apart from the upper protrusion, the lower protrusion being caught by a portion of the latch member.

5. The locking device according to claim 1, wherein the first elastic member comprises a first coil member and a second coil member to be inserted around opposite ends of the hinge shaft, respectively, and a connecting bar for connecting the first and second coil members to each other.

6. The locking device according to claim 1, wherein the latch member comprises a guide bar protruded upward from an upper end of the latch member for coupling of the second elastic member, and a locking protrusion protruded downward from a lower end of the latch member so as to be inserted into the holding recess.

7. A locking device for an automobile tray, comprising:

an inner housing having a front panel formed with a holding recess;

an outer housing defining an operating space therein for allowing the inner housing to be slidably moved in the outer housing;

a mount member having a bottom opening for communicating with the holding recess and a front operating opening;

a knob partially protruded outward through the operating opening of the mount member, the knob being linearly moved into the operating opening by manual operation;

a rotating member having a hinge shaft connected to the mount member, so as to be rotated by the knob, and lower protrusions;

a first elastic member having one end supported by the mount member and the other end supported by the rotating member, the first elastic member providing the rotating member with an elastic restoration force to allow the rotating member to be returned to its original position;

a latch member having a body configured to be caught by one end of the rotating member coupled with the rotating member, the latch member being moved upward by the rotating member so as to be released from the holding recess, wherein rotation of the rotating member causes the lower protrusions of the rotating member to lift the latch member in a vertical direction; and a second elastic member installed between the latch member and the mount member and adapted to provide the latch member with an elastic restoration force, so as to allow the latch member to be returned downward through the bottom opening of the mount member, the lower protrusions of the rotating member being inserted into openings of the latch member.

* * * * *